(12) United States Patent
Haritaoglu (10) Patent No.: US 8,587,668 B2
(45) Date of Patent: Nov. 19, 2013

(54) METHOD AND APPARATUS FOR DETECTING NEAR DUPLICATE VIDEOS USING PERCEPTUAL VIDEO SIGNATURES

(75) Inventor: Ismail Haritaoglu, San Jose, CA (US)

(73) Assignee: Anvato, Inc., Mountain View, CA (US)

( * ) Notice: Subject to any disclaimer, the term of this patent is extended or adjusted under 35 U.S.C. 154(b) by 361 days.

(21) Appl. No.: 13/055,786

(22) PCT Filed: Jul. 27, 2009

(86) PCT No.: PCT/US2009/051843
§ 371 (c)(1),
(2), (4) Date: Jan. 25, 2011

(87) PCT Pub. No.: WO2010/011991
PCT Pub. Date: Jan. 28, 2010

(65) Prior Publication Data
US 2011/0122255 A1    May 26, 2011

Related U.S. Application Data

(60) Provisional application No. 61/083,742, filed on Jul. 25, 2008.

(51) Int. Cl.
*H04N 17/00* (2006.01)
(52) U.S. Cl.
USPC ............................................. 348/180
(58) Field of Classification Search
USPC .......... 382/103, 170, 107; 348/180, E17.001; 700/94; 707/E17.022
See application file for complete search history.

(56) References Cited

U.S. PATENT DOCUMENTS

| | | |
|---|---|---|
| 5,513,260 A | 4/1996 | Ryan |
| 5,659,613 A | 8/1997 | Copeland et al. |
| 5,668,603 A | 9/1997 | Copeland |
| 5,721,788 A | 2/1998 | Powell et al. |
| 5,883,959 A | 3/1999 | Kori |
| 6,018,374 A | 1/2000 | Wrobleski |
| 6,373,960 B1 | 4/2002 | Conover et al. |
| 6,381,367 B1 | 4/2002 | Ryan |
| 6,438,275 B1 * | 8/2002 | Martins et al. ............... 382/300 |
| 6,774,917 B1 | 8/2004 | Foote et al. |
| 6,785,815 B1 | 8/2004 | Serret-Avila et al. |
| 6,937,766 B1 | 8/2005 | Wilf et al. |
| 6,975,746 B2 | 12/2005 | Davis et al. |

(Continued)

FOREIGN PATENT DOCUMENTS

| | | | |
|---|---|---|---|
| WO | 2007148290 A2 | 12/2007 | |
| WO | WO 2007/148290 | * 12/2007 | |

OTHER PUBLICATIONS

Supplementary European Extended Search Report and the European Search Opinion; European Application No. 09801114; (8) pages, (Apr. 10, 2012).

*Primary Examiner* — Amara Abdi
(74) *Attorney, Agent, or Firm* — Boyle Fredrickson, S.C.

(57) ABSTRACT

Methods and apparatus for detection and identification of duplicate or near-duplicate videos using a perceptual video signature are disclosed. The disclosed apparatus and methods (i) extract perceptual video features, (ii) identify unique and distinguishing perceptual features to generate a perceptual video signature, (iii) compute a perceptual video similarity measure based on the video edit distance, and (iv) search and detect duplicate and near-duplicate videos. A complete framework to detect unauthorized copying of videos on the Internet using the disclosed perceptual video signature is disclosed.

18 Claims, 8 Drawing Sheets

(56) References Cited

U.S. PATENT DOCUMENTS

| | | |
|---|---|---|
| 7,043,019 B2 | 5/2006 | Tehranchi et al. |
| 7,167,574 B2 | 1/2007 | Kim |
| 7,177,470 B2 * | 2/2007 | Jasinschi et al. .............. 382/170 |
| 7,185,201 B2 | 2/2007 | Rhoads et al. |
| 7,218,754 B2 | 5/2007 | Schumann et al. |
| 7,272,240 B2 | 9/2007 | Goldberg et al. |
| 7,298,930 B1 * | 11/2007 | Erol et al. ..................... 382/305 |
| 7,325,013 B2 | 1/2008 | Caruso |
| 7,421,376 B1 | 9/2008 | Caruso et al. |
| 2003/0033347 A1 | 2/2003 | Bolle et al. |
| 2003/0045954 A1 | 3/2003 | Weare et al. |
| 2004/0085339 A1 | 5/2004 | Divakaran et al. |
| 2004/0221237 A1 | 11/2004 | Foote et al. |
| 2005/0251532 A1 | 11/2005 | Radhakrishnan et al. |
| 2006/0029253 A1 | 2/2006 | Pace |
| 2006/0111801 A1 | 5/2006 | Weare et al. |
| 2006/0291690 A1 * | 12/2006 | Roberts ......................... 382/100 |
| 2007/0253594 A1 | 11/2007 | Lu et al. |
| 2008/0027931 A1 | 1/2008 | Lu et al. |
| 2008/0040807 A1 | 2/2008 | Lu et al. |
| 2009/0074235 A1 * | 3/2009 | Lahr et al. .................... 382/100 |

\* cited by examiner

FIG. 9 pVF$^n$: n$^{th}$ Perceptual Video Fingerprint
VB$^n$: n$^{th}$ Video Buffer

METHOD AND APPARATUS FOR DETECTING NEAR DUPLICATE VIDEOS USING PERCEPTUAL VIDEO SIGNATURES

CROSS-REFERENCE TO RELATED APPLICATIONS

This application claims the benefit of U.S. Provisional Application No. 61/083,742. The provisional application entitled "Method and Apparatus for Detecting Near Duplicate Videos Using Perceptual Video Signatures" was filed on Jul. 25, 2008 and is hereby incorporated by reference in its entirety.

BACKGROUND OF THE INVENTION

1. Field of the Invention

The present disclosure relates primarily to video processing, video representation, and video source identification, more specifically, to generation of digital video signature as a compact representation of the video content.

2. Discussion of the Related Art

Efficient video fingerprinting methods to detect duplicate video content for a variety of purposes, such as the detection of copyright infringement, have been explored. It remains a major challenge, however, to reliably detect copyright infringement or other reproductions when the video content has been changed due to formatting modifications (e.g. conversion to another format using a different video compression), scaling, or cropping of the video content either in time or spatially.

As is known to those skilled in the art, video refers to streamed or downloaded video, user generated or premium video in any format, any length or any encoding. A duplicate copy of a video has the same perceptual content as the source videos regardless of video size, format, or encoding. In a near-duplicate or similar copy of a video, some but not all of the content of the video is altered either by changing the duration of the video, by inserting or deleting video frames, or by modifying the size, format, or encoding of the original video.

Recent advances in broadband network speed, video recording and editing software tools, as well as an increasing number of video distribution and viewing sites on the Internet have made it easy to duplicate and edit a video for posting in a video distribution site on the Internet. This leads to large numbers of duplicate and near-duplicate videos being illegally distributed on the World Wide Web (Web).

The sources for duplicate videos on the web may be classified into three categories:

Videos created from broadcast video signals—A user records a broadcast video signal into a computer or digital storage device (e.g. Tivo, DVR) and then uploads this new video to video distribution and sharing sites (e.g. YouTube, Metacafe). The broadcast video and the recorded video may differ in quality and format, but their content is the same or similar (duplicated or near-duplicated).

Videos created from electronic medium—User rips/extracts the video from an electronic medium (e.g. DVD) and duplicates it in a different format. The new video may potentially include additional content or other edits to the original content.

Videos created from existing web videos—User downloads a video from a video distribution/sharing site and uploads it to another video distribution/sharing site. The new video may potentially include format edits, additional content, or other edits to the original content.

Although the original content is wholly or nearly duplicated, in each case a new video file is generated.

The ease with which videos may be duplicated, modified, and redistributed creates a significant potential for copyright infringement. Further, detecting duplicate and near-duplicate videos on the web is a challenge because of the difficulty in comparing duplicate or near-duplicate videos to the original content. Thus, it would be desirable to have a method to protect the original video content by detecting duplicate and near-duplicate videos such that the copyright owners may receive proper credit and revenue for their original works.

Previous efforts to identify duplicate and near-duplicate videos have used either watermarking or fingerprinting techniques or a combination thereof. The main difference between these techniques is in how the resulting identification marker is stored. Watermarking techniques embed the identification markers into the video file (i.e., video content) while fingerprinting techniques store the identification markers separately as a new file. However, such video identification techniques have not been met without incurring various disadvantages.

With video watermarking techniques, a new watermarked video file is created by embedding an identification marker (visual or non-visual) into the original (source) video file. During the detection phase, video is processed to determine whether the identification marker is present. The video watermarking algorithms add extra identification information to the video buffer or compression coefficients. When a watermark is added to a video buffer, the contents of some of the pixels in the video buffer are modified in a way that the modifications are not recognizable by a human eye but are detectable by the proper watermarking reader software. However, the watermarking techniques are not robust to changes in formatting and encoding of the video. In addition, edits or compressions applied to the video to reduce the file size may similarly degrade the watermark. The afore-mentioned modifications on the video are among possible ways of generating duplicate or near-duplicate videos. Therefore, the watermarking-based solution is not suitable for reliable detection of duplicate or near-duplicated videos.

An alternative approach to embedding an identification marker in the video is to generate a separate video fingerprint as meta-data. The main idea behind fingerprinting is to process a video file to generate unique features (e.g. length, size, number of frame, compression coefficients, etc.) specific to this video with a significantly small amount of data. A duplicate or near-duplicate video is then detected by comparing the resulting fingerprints of two videos for a sufficient number of fingerprints that match. The accuracy and robustness of fingerprinting-based duplicate or near-duplicate video detection techniques are limited by the number of video fingerprints computed, the discriminative power, and the number of fingerprints selected for video comparison. Accurate detection in a large video collection (e.g., billions of video files uploaded to the top ten video distribution/sharing sites) generally comes at the cost of time and computational complexity.

SUMMARY OF THE INVENTION

Consistent with the foregoing and in accordance with the subject matter as embodied and broadly described herein, a method and system for generating and detecting perceptual digital fingerprints of video is described in suitable detail to enable one of ordinary skill in the art to make and use the invention. Methods and apparatus for detection and identification of duplicate or near-duplicate videos using a perceptual video signature are disclosed. The disclosed apparatus and methods (i) extract perceptual video features, (ii) identify unique and distinguishing perceptual features to generate perceptual video signature, (iii) compute a perceptual video similarity measure based on the video edit distance, and (iv) search and detect duplicate and near-duplicate videos.

In one aspect of the invention, a method for identifying a video signal receives a video signal at a processing device from an input device operably connected to the processing device. The processing device executes the following steps: extracting at least one perceptual feature from multiple frames of the video signal, assigning a weighting value to each perceptual feature, selecting at least a portion of the perceptual features according to the weighting value, and creating a digital fingerprint from the selected perceptual features. The digital fingerprints, which identify the video signal according to the sorted perceptual features, are stored in a database.

As another aspect of the invention, the processing device may further extract at least one additional feature from the multiple frames of the video signal and include the additional feature in the digital fingerprint. Each additional feature may be either a scene change or an object displayed in the video signal. Additionally, the processing device may normalize the height and width of the video signal prior to extracting the perceptual feature. The video signal may include a visual and an audio component. As yet another feature, the extracted perceptual feature may be extracted from either the visual or the audio component.

As yet another aspect of the invention, the processing device may segment the frames into a plurality of regions prior to extracting the perceptual feature. The weighting value may be a magnitude and a direction of motion energy identified in each of the regions. The processing device may also select at least one region to include in the digital fingerprint according to the magnitude of motion energy in the region and include the magnitude and direction of the motion energy and a centroid and a size of each selected region in the digital fingerprint.

As still another aspect of the invention, the processing device may select a color space prior to extracting the perceptual feature. The weighting value is a color histogram identifying the colors in the frame. The processor may identify at least one desired color according to the color histogram and segment the frame into a plurality of regions according to each desired color. The color and a centroid and size of each selected region are included in the digital fingerprint.

As another aspect of the invention, the processor may detect a set of perceptual features in a first frame, detect a change in the set of perceptual features in a second frame, determine a time marker at which the change in the set of perceptual features occurred, and include the time marker of the change in the digital fingerprint. The change detected may be either identifying a perceptual feature in the second frame which is not present in the first frame or identifying a perceptual feature in the first frame which is not present in the second frame. The time marker may be normalized with respect to the length of the video signal.

As yet another aspect of the invention, the digital fingerprint may be generated by a first frame and a second frame that is not consecutive to the first frame. The second frame may be separated from the first frame, for example, by about one second. The perceptual feature may be a color, a motion, or a scene, and the additional features may be a scene change a face, a person, an object, an advertisement, and an inserted object. Each additional feature may further include a time-normalization marker which is stored with the additional feature. As one embodiment of the invention, the digital fingerprint includes a first and a second motion, a first and a second color, and a first time-normalization marker.

As still another aspect of the invention, the processor may concatenate multiple digital fingerprints to create a digital signature and store the digital fingerprints in the database as a part of the digital signature. The processor may also assign a cost value to a plurality of edit operations, compare a first digital signature to a second digital signature to identify each edit operation required to transform the first digital signature to the second digital signature, add the total cost of each of the edit operations, and compare the total cost of the edit operations against a predetermined level to determine whether the first and the second digital signatures identify a near-duplicate video signal. The edit operations may be selected from one of a frame insertion, a frame deletion, a frame substitution, and a frame modification. The total cost may be normalized with respect to a length of the video signal. The first and the second digital signature may be converted to a first and a second string value, respectively, prior to comparing the two digital signatures.

As yet another aspect of the invention a method for identifying a first video that is a near duplicate of a second video receives a first video signal at a processing device from an input device operably connected to the processing device. The processing device extracts a first digital signature of the first video signature, and the first digital signature identifies at least one perceptual feature of the first video. The processing device reads at least one additional digital signature from a digital signature database. The additional digital signature identifies at least one perceptual feature of the second video. The processing device compares the first digital signature to the additional digital signature to determine a video edit distance between the first and the second digital signatures.

It is still another aspect of the invention that a system for comparing a first video signal to a second video signal for the purpose of identifying duplicate or nearly duplicate videos includes a processing device configured to receive the first video signal and to calculate a first perceptual digital signature of the first video signal. The first perceptual digital signature includes multiple perceptual digital fingerprints. The system also includes a database operably connected to the processing device containing a plurality of additional perceptual digital signatures. Each additional perceptual digital signature includes multiple perceptual digital fingerprints. The processing device compares the first perceptual digital signature to at least a portion of the additional perceptual digital signatures to identify duplicate videos. The system may include a network connecting the database to the processing device.

As another aspect of the invention, the processing device may divide the first perceptual digital signature into a plurality of segments for comparison to the additional perceptual digital signatures using a video edit distance. The processing device may further identify each segment of the first perceptual digital signature as a partial match of the additional digital signature if the video edit distance between at least three fingerprints of the first perceptual digital signature and three fingerprints of the additional perceptual digital signatures is zero. If at least three segments of the first perceptual digital signature are a partial match of the additional perceptual digital signature, the processing device identifies the first video signal as a near-duplicate of the second video signal.

As still another aspect of the invention, the database includes perceptual digital signatures of at least one copyrighted video and the processing device identifies if the first video signal is infringing the copyrighted video.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Preferred exemplary embodiments of the subject matter disclosed herein are illustrated in the accompanying drawings in which like reference numerals represent like parts throughout, and in which.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.
System Overview The present system and method (i) generate a unique perceptual signature (a sequence of perceptual video fingerprints) for each video file, (ii) define a similarity metric between two videos using video edit distance, (iii) determine and identify duplicate/near-duplicate videos using perceptual signatures, and (iv) determine if a segment of video is a near-duplicate of another video segment.

Unlike known fingerprint and watermarking techniques, the present invention processes video to extract perceptual features (i.e., features that can be viewed and observed by a human) directly related to the objects and their features in the video content. Detecting perceptual features is robust to changes in video encoding format or video edit operations. Therefore, detecting perceptual features provides a reliable identification of near-duplicate videos in situations where existing identification techniques fail, for example when comparing videos generated by heavy compression, format changes, content editing, or time editing.

In one embodiment, video processing techniques are disclosed to generate perceptual video signatures which are unique for each video. Generating video signatures for each video requires (i) extracting the perceptual video features (e.g., object segmentation followed by extraction of the perceptual object features such as motion and color features), and (ii) identifying the unique and distinguishable perceptual video features to be stored in the video fingerprint. Fast and scalable computer vision and image processing techniques are used to extract the unique perceptual object and video features. Unlike known watermarking and fingerprinting techniques, the perceptual video signatures are not embedded in the video files. Extracted perceptual video signatures from each video are stored in a video signature database as a separate file. This video signature database is used for identification of the duplicate and near-duplicate videos.

Identification of a duplicate or near-duplicate video is performed by computing a similarity measurement between the video under consideration and the videos in the database. In one embodiment, a video-edit-distance metric measures this similarity. Video-edit-distance is computed either as a direct function of the actual video files or as a function of the extracted video signatures and fingerprints. Depending on the approach chosen for computation, the video edit distance determines the degree of common video segments, buffers, or fingerprints. The present system includes a novel algorithm to compute video edit-distance between two videos as a function of their perceptual video signatures.

A complete duplicate or near-duplicate video detection and identification framework consists of three main processing steps: (i) registering a video by extracting its perceptual video signature; (ii) building/updating a remote video signature database where perceptual video signatures from every registered video are stores; and (iii) deciding if a video is a duplicate or near-duplicate copy of any registered video(s) in this database.

The duplicate and near-duplicate video detection ability of the present system is useful in detecting copyrighted videos posted to video sharing and distribution sites.

The application area of the present system is not limited to copyright infringement detection. The video-edit-distance yields a video content similarity measure between videos, allowing a search for videos with similar perceptual content but not classified as near-duplicate videos. For instance, searching for all episodes of a sitcom video using one episode is possible through the video-edit-distance metric. Further applications of the present invention include object (e.g., human, cars, faces, etc) identification in the video.
Detailed Description Turning first to FIG. 1, an exemplary environment for the use of digital fingerprinting is disclosed. An original video may be produced at a production studio 10. It is contemplated that the original video may be similarly be produced by an individual using a video recorder, camera, cell phone or any other video recording device or system. The original video may then be broadcast, for example, by satellite 20. However, any technique for broadcasting, transmitting, or distributing the video may be used, including cable, streaming video on the Internet, Digital Video Disc (DVD) or other physical storage medium, and other digital or analog media. The original video is received by a second party and a copy is made at the duplication facility 30. The duplication facility 30 may be another studio, a recording device such as a DVR, or a home computer. The original video and the duplicate or near-duplicate video are then both available on a network 40, such as the Internet.

Figure 1:
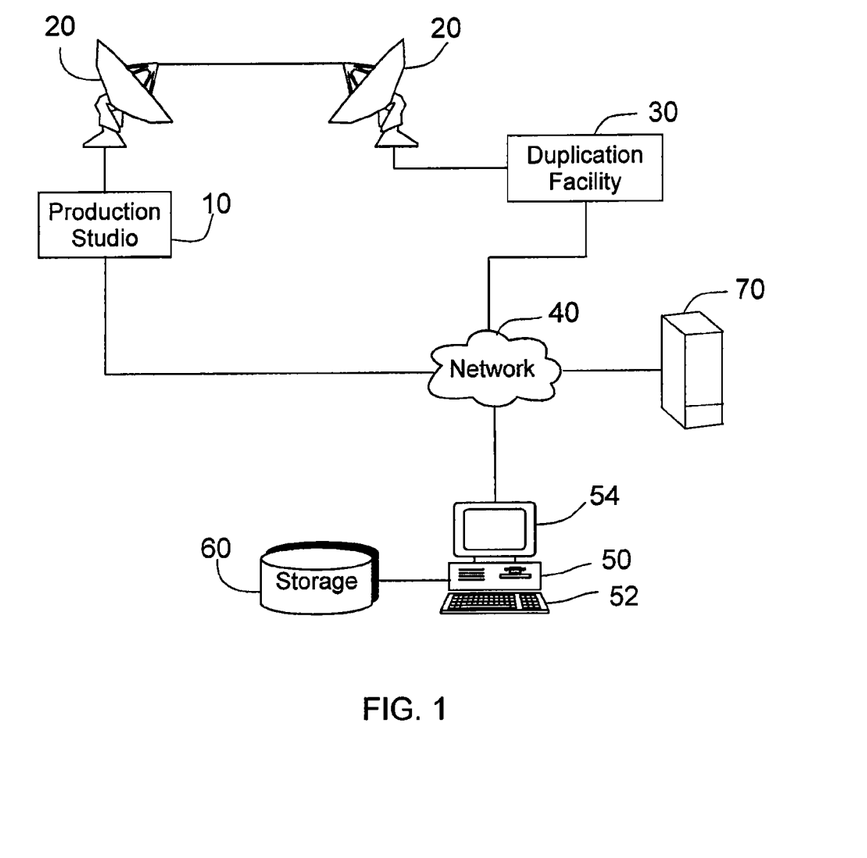
FIG. 1 is a representation of one system used to detect duplicate and near-duplicate videos.

A digital fingerprint of either the original or duplicate video may then be generated. Any computing device 50 including a processor, appropriate input and output interface units, a storage device 60, and a system network or bus for data communication among elements may be used. The processor preferably executes machine-executable instructions (e.g. C programming language) to perform one or more aspects of the present invention. At least some portion of the machine executable instructions may be stored on the storage devices 60. Examples of suitable computing devices include, but are not limited to multiprocessor systems, programmable consumer electronics, network computers, and set-top boxes.

In FIG. 1, the computing device is illustrated as a conventional personal computer 50. A user may enter commands and information into the personal computer 50 through input devices such as a keyboard 52, mouse etc. The output device may include a monitor 54 or other display providing a video interface. The computer 50 may be connected by a network 40, which defines logical and physical connections, to a remote device 70. The remote device 70 may be another personal computer, a server, a router, or a network computer. The computer 50 may retrieve video signals from the storage device 60 or the remote device 70. Alternately, a video capture device may be directly or indirectly attached to the computer 50. Similarly, a video signal may be connected to the computer 50 from a television or DVD player. As still another option, a video signal coming directly from the production studio 10, for example by cable, satellite, or streaming video may be captured by the computer 50.

Figure 2:
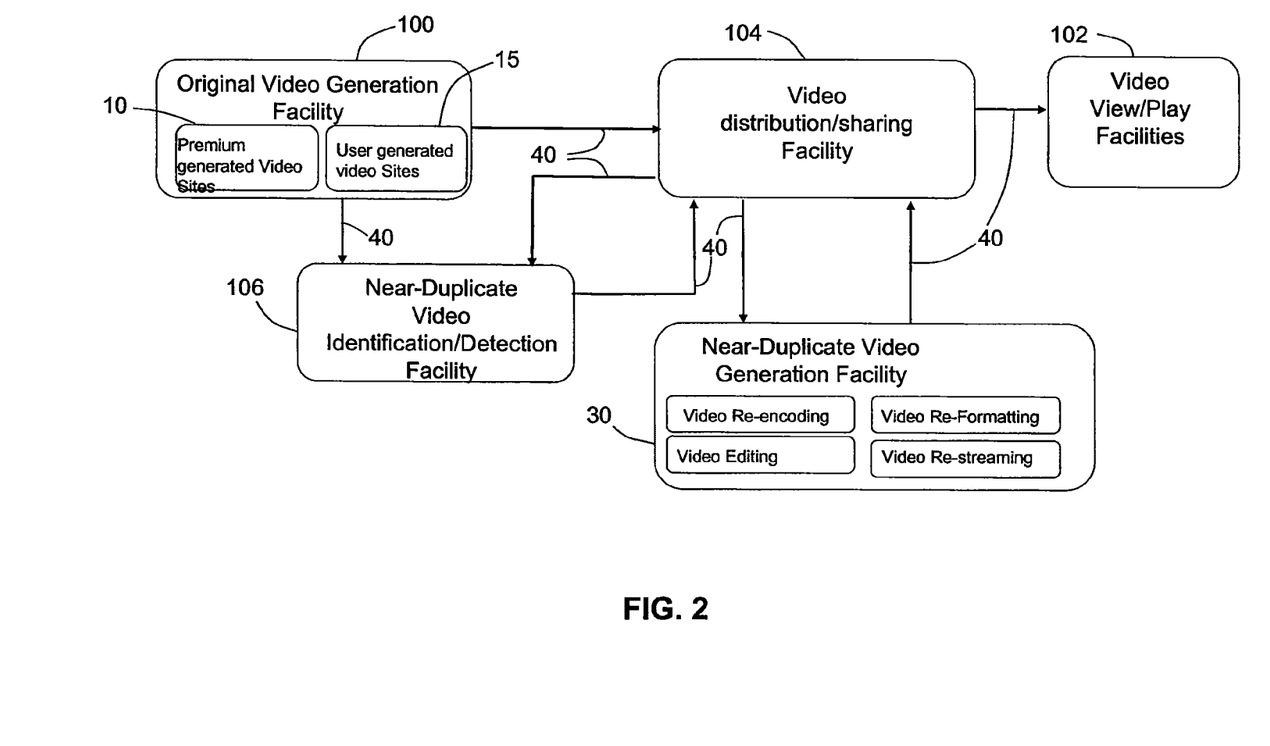
FIG. 2 is a flowchart of exemplary facilities participating in generating and distributing video, near-duplicate video, and video signatures.

A more generalized environment for the use of digital fingerprinting is shown in the high level block diagram of FIG. 2. Original video generation facilities 100, near-duplicate video creation facilities 30, video viewing/playing facilities 102, video sharing-distribution facilities 104, and video identification facilities 106 may be connected to each other via the network 40 (such as the Internet).

Video providing/generation facilities 100 include any entities or locations where original video content are created or where video providers are the legitimate owners of the video content. These facilities 100 may include professional video production companies 10 or any facility or user-generated site 15 where individuals or other non-professional groups create and/or distribute videos using a video capture device or the like (e.g. user generated videos-UGV). All of these video providers have the legal rights to distribute their legitimately owned videos to others.

Video sharing and distribution facilities 104 (e.g. YouTube, etc) provide services to make the video available for viewing to others on the network 40. Users can use their computer to access these sites to watch/view the video or to download the video to their computers from these facilities 104.

Near-duplicate video generation facilities 30 create new videos by altering the original videos. Near-duplicate video generation facilities 30 might have direct access to the video providers or the video distribution sites. Alternately, the near-duplicate video generation facilities 30 may record broadcast video streams, download video from video distribution/sharing facilities 104, or obtain the video from another source. These near-duplicate video generation facilities 30 also have access to the video distribution facilities 104 to upload and distribute the generated near-duplicate videos.

The video identification facilities 106 perform registration, indexing, sorting, identification and searching functions. These functions may be preformed by the same entity or separate entities. Furthermore, these functions may be performed at a single site or multiple sites.

During registration at a video identification facility 106, video signatures 200 (described below with respect to FIG. 5) are stored in video signature databases along with the related information such as the ownership information. Content owners either generate the video signatures 200 at their location and then upload them to the video identification facility 106, or provide the videos to the video identification facility 106 for processing to generate the video signatures 200. During indexing, the video signatures 200 are then provided with an indicia, sorted, and stored in the video signature databases.

A near-duplicate video identification facility 106 may accept a query from a video distribution facility 104 over the network 40 which includes a video signature 200 and compares this video signature 200 with all the video signatures 200 stored in the registration database to determine whether it is near-duplicate.

Alternatively, the identification operation can be performed at the video distribution facility 104. In this scenario, the video signatures 200 stored in the registration database may be available to video distribution facilities 104 from remote video identification facilities 106 such that the identification operation may be performed.

The present system provides a scalable and fast near-duplicate video identification technique robust to modifications made to the original source videos. The technique provides minimum false positives (i.e., false indication of an original video as a near-duplicate video) and false negatives (i.e. false indication of a near-duplicate video as an original video). The present system can further identify a video which contains only a segment of the original video as being near-duplicate.

At a high level, the present system may function to identify near-duplicate videos. It is presumed that a near-duplicate video identification framework necessarily identifies exact duplicate videos, too. Therefore when the term near-duplicate detection is used, it should be understood that exact duplicate or partial duplicate are also detected.

A video includes both visual and audio components. The present system contemplates that perceptual features exist in both visual and audio components of a video. For example, visual components may include motion, color or object recognition, or scene changes. Audio components may include a theme song, common sequences of notes or tones, or distinctive phrases repeated throughout the video.

The present system assumes a transitive property between near duplicate videos which have the same original source. For instance, if video A is a near duplicate of video B, and video B is a near duplicate of video C, then video A is considered a near duplicate of video C.

The present system may also function to measure the similarity between videos, to detect near-duplicate videos or measure the similarity between two non-near duplicate videos. This particular function requires defining a robust video similarity metric called a "video edit distance". The video similarity metric should be robust to various types of video transforms and edit operations such as encoding and decoding, resolution changes, modifying, inserting and deleting content, and many more. The computation of a similarity score based on this metric is computationally fast and scalable to be effective.

Most professionally generated videos may have multiple episodes. Although each episode has different video content, two different episodes may share common perceptual features, such as, the scene in which the video has been produced, the cast members, and objects in the background (e.g. wall, posters etc). In the context of detecting similar non-duplicate videos, the present system may also be used to search for and identify non-duplicate videos which have common perceptual video features.

In the present invention, the main functions to identify near-duplicate videos are to: for each input video, (i) extract the perceptual video features by processing video buffers, (ii) generate a perceptual video signature by selecting unique and distinguishable perceptual video features, (iii) define a video similarity metric (i.e., video edit distance metric) as a function of the perceptual video signatures to measure similarity between two videos, (iv) determine near duplicate videos based on the computed video edit distance measurements, and (v) search similar videos which are not near-duplicate but similar in content by comparing their perceptual video signatures.

Success of the use of perceptual video signatures in this context depends on (i) the robust perceptual video features definitions (e.g. objects, motion of objects, color distribution of video buffers, scene changes etc), (ii) how the distinguishable and the near-unique perceptual features for a predetermined length of video segment are selected to generate video fingerprints, and (iii) establishment of a novel data structure to concatenate these video fingerprints yielding a video signature to aid near-duplicate video detection and non-near duplicate video search.

Figure 3:
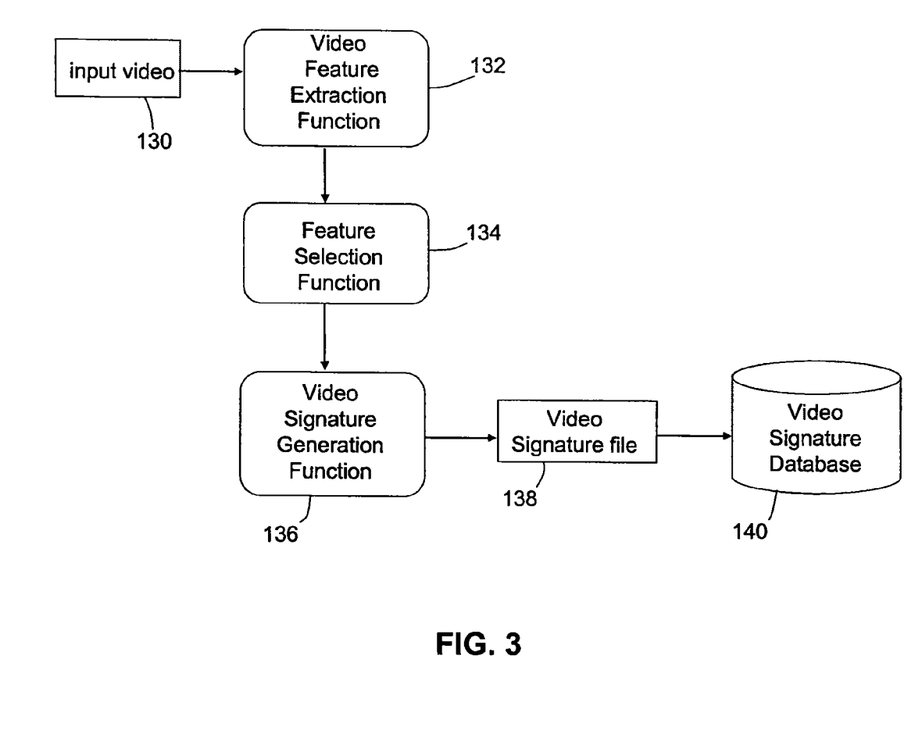
FIG. 3 is a flowchart illustrating video registration with perceptual video signature generation.
Figure 4:
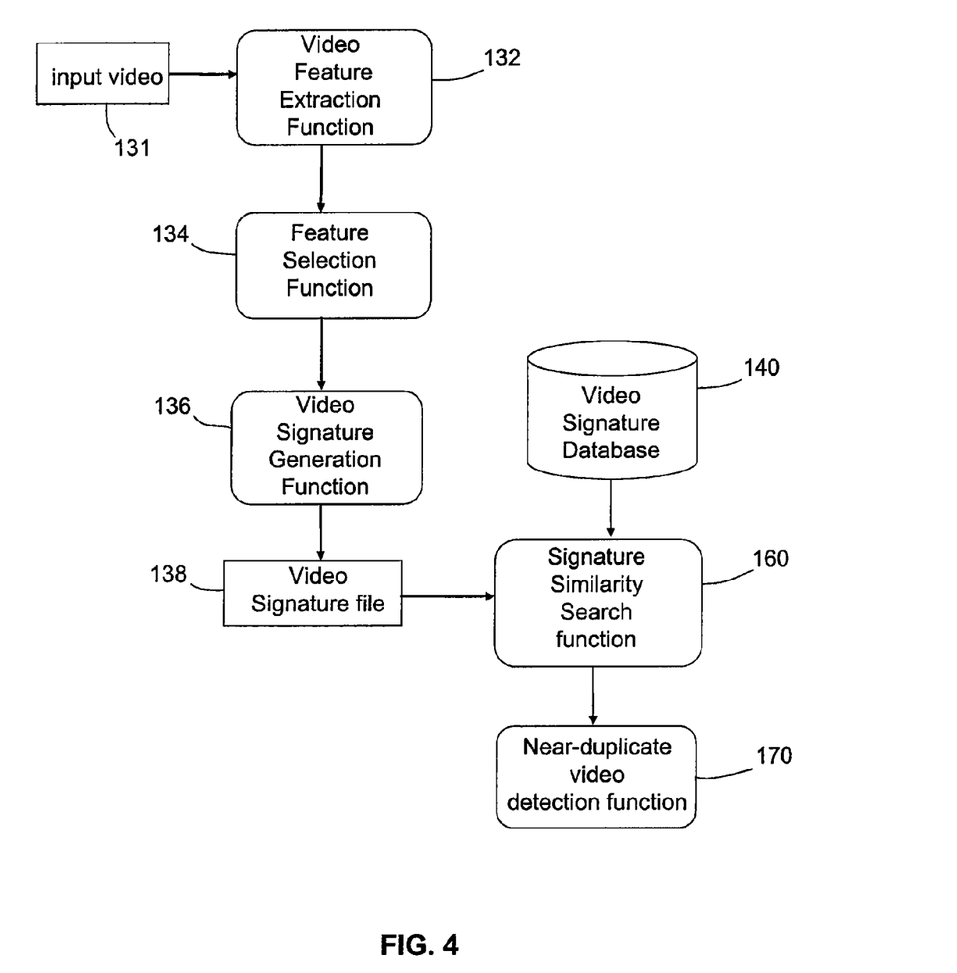
FIG. 4 is a flowchart illustrating near-duplicate video identification and detection processes.

FIGS. 3 and 4 are process diagrams that illustrate operations performed by the present embodiment. The operations may be executed by a processing device, such as a personal computer. Optionally, the processing device may be multi-processor systems, programmable consumer electronics, network computers, and set-top video receiver boxes. It is understood that a processing device may include a single device or multiple devices operably connected for example by a network 40. Additionally, one or more steps may be performed by separate processing devices, each processing device connected by a network 40 to at least one of the other processing devices. According to FIG. 3, a perceptual video signature 200 may be generated by processing an input video 130. The input video 130 may be a live broadcast from a production studio 10, a digital file stored in a storage device 60, or any other video signal provided to an input device for the computer performing the video feature extraction function 132.

Figure 9:
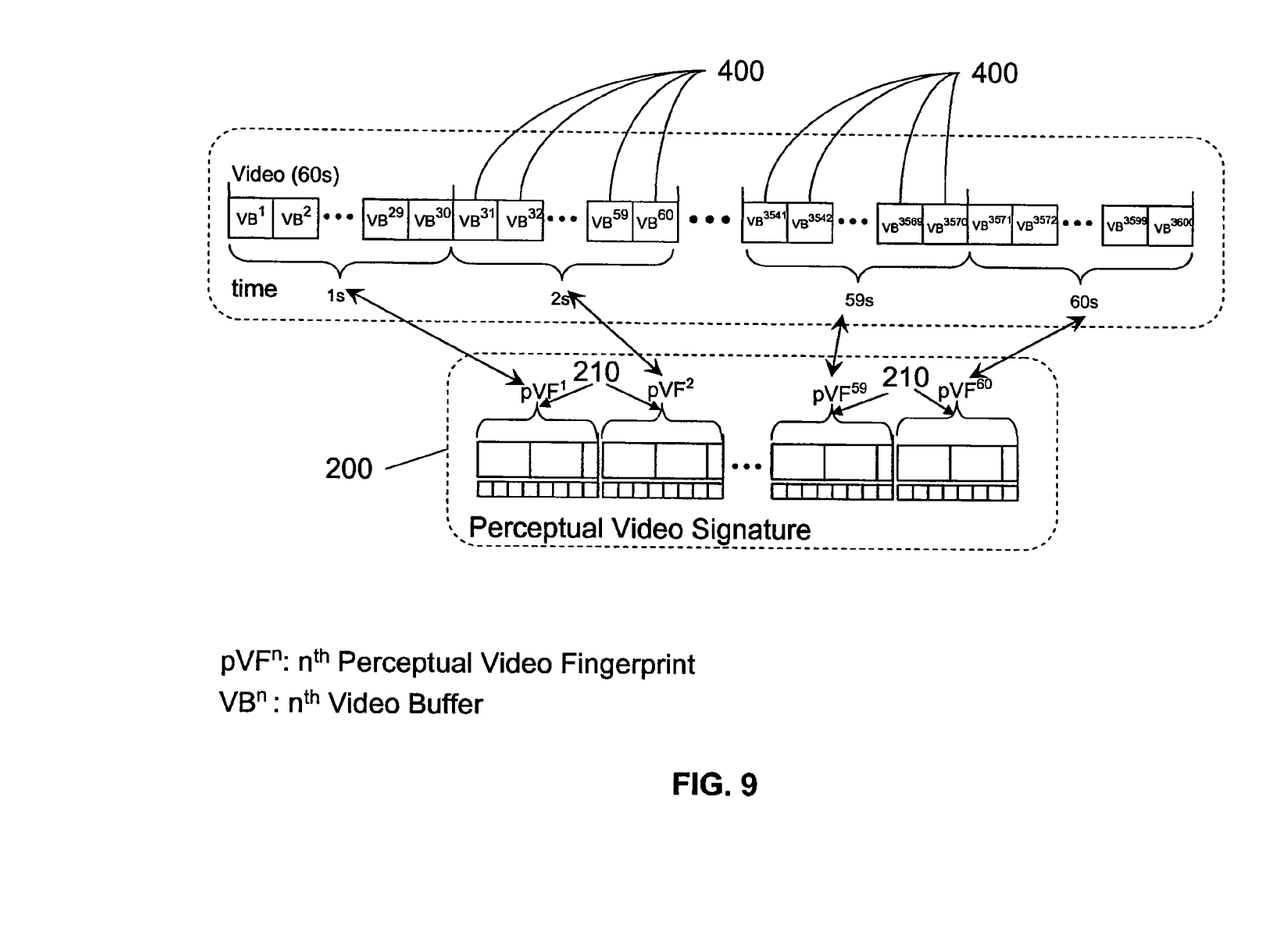
FIG. 9 is a block diagram representation of generating a perceptual video signature.

The video feature extraction function 132 operates to identify and extract perceptual 220 and additional 222 features (discussed below with reference to FIG. 6) from an input video signal 130. As is known in the art, video signals may be provided in many formats such as a cable or satellite signal; a VHS tape; a DVD, Blue Ray, or HD DVD disc; or as a digital file, such as an MPEG file. In addition, the original video may have been filmed in a different format than the format in which the video is provided. Consequently, the video may have been converted and stored in either a compressed or uncompressed format and each format may have many different characteristics, such as differing frame rates, resolutions, aspect ratios, compression, and the like. The processing device of the present system begins the video feature extraction function 132 by first decoding each input video 130 and loading the video to memory or another storage device operably associated with the processing device. As is known in the art, decoding may be performed using one of many standard codecs (i.e. compression/decompression algorithms such as H.261, H.263, MPEG, and WMV) according to the format of the input video signal 130. Preferably, each frame of a video signal is stored in a video buffer 400 created in the memory (an example of which is illustrated in FIG. 9). The individual buffers 400 may be sequentially arranged to store a portion of the video signal, for example, FIG. 9 illustrates 60 seconds of input video 130 having 30 frames per second being stored in buffers 400.

The processing device performs digital image processing to create histograms identifying characteristics of the video signal, for example motion and color. The histograms provide a statistical representation of occurrence frequency of particular objects, such as color within the frame. The processing device may generate histograms for varying numbers of buffers. For example, if a digital fingerprint 210 is to identify characteristics of 1 second of data and the video signal 130 has a frame rate of 30 frames/second, then thirty buffers 400 would be used. Similarly, to characterize 2 seconds of video signal with the above-mentioned qualities, sixty buffers 400 would be used.

The video feature extraction function 132 extracts perceptual video features 220 from the video signal by processing the histograms characterizing the input video 130. The histograms may be used to identify a series of buffers 400 that has motion by using video buffer differencing. Video buffer differencing is one way to determine the difference between two video buffers 400. In video buffer differencing, the value of each pixel, typically in grayscale or in color, of one video buffer 400 is compared to a corresponding pixel in another video buffer 400. The differences are then stored in memory for each pixel. The magnitude of the difference between the two buffers typically indicates whether the two video buffers 400 contain similar content. If there is no difference in the scene and no motion in the camera, the video buffer differencing should provide a difference of zero. Consequently, the difference values obtained by comparing the statistical data in the histograms may be used to detect motion across a series of buffers 400.

Color histograms may similarly be used to segment buffers 400 into regions having similar color segments.

The video feature extraction function 132 may also operate to detect scene changes. The processing device may analyze the histograms to determine, for example, an abrupt change in perceptual features 220 between one buffer 400 and the next to identify a potential change in scene. Preferably, a time-marker of the buffer 400 associated with the scene change is also identified.

After extracting the perceptual video feature 220 from the input video 130, a feature selection function 134 executing on the processing device determines which features 220 are stored in the digital fingerprint 210. Each of these perceptual features 220 is assigned a weighting factor according to how identifiable or distinguishable the feature 220 is in the video 130. The weighting factor may be selected, for example, by the frequency of occurrence of a feature 220 in the previously determined histograms. Each of the features are sorted according to the weighting factor. A portion of the features having the highest weighting factors are then selected to be included in the digital fingerprint 210. For example, segments of buffers having a higher level of motion may be assigned a greater motion energy weighting factor. Similarly, colors that are present in a buffer in a higher concentration may be assigned a higher weighting factor. These identified features may subsequently be sorted according to the assigned weighting factor. Any number of distinguishable features may be included in the digital fingerprint 210; however, it is understood that storing an increasing number of features requires an increasing amount of storage space. Preferably, at least five features with the highest weighting scores are included in each digital fingerprint 210, and more preferably, two motion features, two color feature and one scene change feature are included in each fingerprint. The feature selection function 134 creates a series of fingerprints 210 according to the frequency in time at which information identifying the input video 130 is desired.

The processing device next executes a video signature generation function 136 then concatenates the fingerprints 210 into a perceptual video signature 200. It is contemplated that multiple video signatures 200 may be produced for any given input video 130. The resulting video signature will depend for instance on the criteria for assigning weighting factors to the perceptual features 220 or on the time intervals between successive fingerprints 210. The video signature 200 is stored as a video signature file 138. The video signature files 138 is the stored in a video signature database 140. The database 140 may be, for example, stored on a data storage unit 60 local to a computer 50, a remote device 70 connected to the computer 50 via a network 40, such as the Internet, or a combination thereof The database 140 may similarly be a single database 140 or multiple shared databases distributed over many computers or facilities. For example, any of a video generation facility 100, video distribution facility 104, or a near-duplicate identification facility 106 may generate a video signature file 138 and maintain a local database 140 or update a shared database 140.

Referring next to FIG. 4, perceptual video signatures 200 previously stored in a database 140 may subsequently be used to identify other video signals. A processing device either connected directly or remotely to the database 140 may be used. A second input video 131 may be obtained, for example, over a network 40 connected to a video distribution facility 104, from a DVD or other storage medium, or any other device that may provide the input video 131 to processing device. An appropriate input device such as a DVD drive, a network interface card, or some other such device, as appropriate for the source of the input video 131, may be used to deliver the input video signal 131 to the processing device. The processing device will identify a perceptual video signature 200 for the second input video 131 in the same manner as shown for the first input video 130 in FIG. 3. The processing device next performs a signature similarity search function 160 to compare the video signature 200 from the second input video 131 to the collection of video signatures 200 stored either locally or remotely in a database 140.

The signature similarity search function 160 preferably determines a similarity score between the video signature 200 of the second video 131 and a signature 200 stored in the database. The similarity score is based on a "video edit distance." An edit distance is a metric used in information theory and computer science to measure the similarity between two strings of characters. Specifically, an edit distance identifies how many edit operations are required to make one string sequence identical to a second string sequence. The edit operations may be, for example, an insertion, a deletion, or a substitution. For example, "kitten" may be changed to "mitten" with one substitution, having an edit distance of one. In contrast, changing "kitten" to "sitting" has an edit distance of three, requiring two substitutions and an insertion.

The "video edit distance" for video is similar in principal to the edit distance used in information theory and computer science. Specifically, the edit distance between two video buffers 400 is given as the number of edit operations required to transform one buffer 400 to the other. Basic video edit operations are video frame insertion, deletion, substitution, and modification (e.g., resizing, rotation, time alignment/shifting, etc.). In order to compute the video edit distance between two videos in this context, a cost value for each edit operation is assigned. The cost value may be a constant value, such as one, for each operation or, optionally, the cost value may be a variable value with different edit operations receiving differing cost values. The video edit distance of two videos is defined as the total cost of all edit operations required to transform one video to the other. The smaller the cost, the more similar the videos are.

The video edit distance of two videos may be computed using a dynamic programming method. In the present system, in order to perform a fast video edit distance computation, stored video signature feature values 220, which have discrete integer values, are transformed (mapped) as string values. There is no information lost or gained in this transformation. However, the resulting string value allows us to use the dynamic programming methods developed for string edit distance to compute video edit distance In the present system, the length of the videos may be significantly different because one video may be just a clip of the second video. In order to eliminate a potential bias on the edit distance computation for videos with significantly different lengths, the video edit distance is normalized with respect to the length of the video. The video edit distance may be normalized by dividing the edit distance by the length of the shorter of the two videos. This normalization step permits the signature similarity search function 160 to compare videos of differing lengths.

The signature similarity search function 160 determines the video edit distance between two videos. The processing unit first determines the video signature 200 of the second video 131 and then retrieves a signature 200 stored in the database 140 for comparison. For purposes of this example, let the video signature 200 stored in the database be identified as sA and the signature 200 of the second video be identified as sB. Each signature 200 contains a discrete number of video fingerprints 210 which may or may not be identical between the two signatures 200. For purposes of this example, let sA have N fingerprints 210 and sB have M fingerprints 210. As a first step in calculating a video edit distance a subset of the N fingerprints 210 in sA is selected. For example, four consecutive fingerprints 210 may be selected as a macro fingerprint unit. The macro fingerprint unit may be greater than four consecutive fingerprints 210, recognizing that the processing required to compare a longer subset of sA against sB may increase the time and computational intensity of the comparison.

The macro fingerprint unit from sA is then compared against sB. As the macro fingerprint unit from sA is compared against portions of sB, the number of edit operations that would be required to convert a fingerprint unit from the macro fingerprint unit of sA to the fingerprint unit in sB against which it is being compared is determined. The video edit distance is the total of the values assigned to each edit operation.

In order to be identified as a match, a portion of sB should align with the macro fingerprint unit such that at least three of fingerprint units have no edit operations between them and exist along the same timeline as identified by the time markers within the fingerprint units. If such a portion of sB is identified, then the macro fingerprint unit is declared a partial match with the corresponding fingerprint unit 210 that comprise that portion of sB. The processing unit repeats these steps, selecting a new subset of sA to be the macro fingerprint unit and comparing the new macro fingerprint unit against sB.

The near-duplicate video detection function 170 uses the video edit distances determined from comparing the macro fingerprint units of sA to sB to identify duplicate and near duplicate videos. If three or more macro fingerprint units are identified as partial matches to sB, then sA is identified as a near-duplicate copy of sB. The video edit distance between the input video 131 and each of the video signatures 200 in the database against which it is compared may be used to detect and group similar videos in the database 140.

Figure 5:
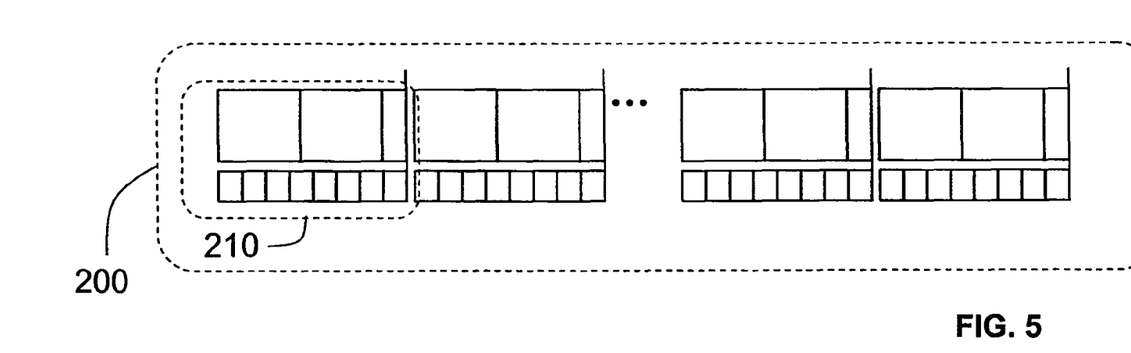
FIG. 5 is a block diagram representation of the components of a perceptual video signature.

FIG. 5 illustrates a high-level data structure for video signatures 200 that are used by the present system. A video signature 200 consists of a sequence of video fingerprints 210. A video fingerprint 210 represents a segment of video with a significantly smaller amount of data than the corresponding video segment. The video segment length may be fixed or dynamically updated. The length of each video segment could be from a single video frame buffer to multiple minutes. The length of a video signature 200 for a given video segment directly relates to the total size (length) of the video fingerprint 210. For example, to represent a 60-second video by one-second video fingerprint 210, the total length of the video signature will be 60. In contrast, if the 60-second video is represented by two-second intervals, the total length of the video signature will be 30.

In one example, a typical one second video with a 320×240 video frame size creates a digital file of 2.1 megabytes. This video may be identified by a digital signature 200 having just 8 bytes of data, resulting in a 1/250000 data reduction. While this significantly compact video representation cannot be used to regenerate the video, it can be used to identify the video and its content. Video fingerprint units 210 may overlap in time or have variable time granularity such that some of the video segments may represent different lengths of video segments.

Figure 6:
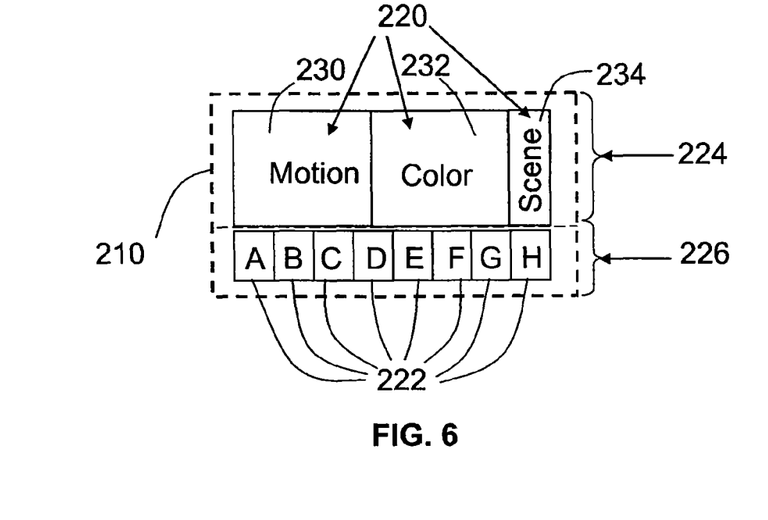
FIG. 6 is a block diagram representation of the components of a perceptual video fingerprint unit.

FIG. 6 illustrates a high-level data structure for a perceptual video finger print unit 210 as used by the present embodiment. Each video fingerprint unit 210 consists of a number of perceptual video features 220 obtained by one or more video processing methods. Perceptual video fingerprints 210 are preferably structured using a hierarchical data structure. For example, a first level 224 of perceptual information is reserved to store perceptual video features 220 for near-duplicate video identification, and a second layer 226 of perceptual information is reserved for additional perceptual features 222 such as video tagging, video advertisement, or insertion related data. The first level 224 of perceptual video may include perceptual video features 220 such as motion 230 or color 232 features of video buffer. The second level 226 of perceptual video features may include extended perceptual video features 222 such as object detection A, object recognition B, human detection C, and face detection D. It is understood that video fingerprints 210 may similarly store both perceptual 220 and extended 222 perceptual features in a single level.

The present system computes the perceptual similarity between two videos. Each video is processed to extract motion 230 and color 232 based perceptual video features 220 according to the processing capabilities of the processor such that the features 220 may be detected at a speed greater than the speed at which a video may be replayed for human viewing. The perceptual feature extraction may be applied to all or a pre-selected subset of the video frame buffers 400, defining the processing speed, as well as the number of features extracted to generate the perceptual video fingerprints 210. The video size (height and width) is normalized to a pre-determined size to make sure size and resolution changes do not affect the computed features. For example, the height and width of each video may be scaled appropriately to match the pre-determined size, such that the two videos may be compared at the same size. Optionally, one video may retain its original size and the size of the second video may be scaled to match the size of the first video.

Figure 7:
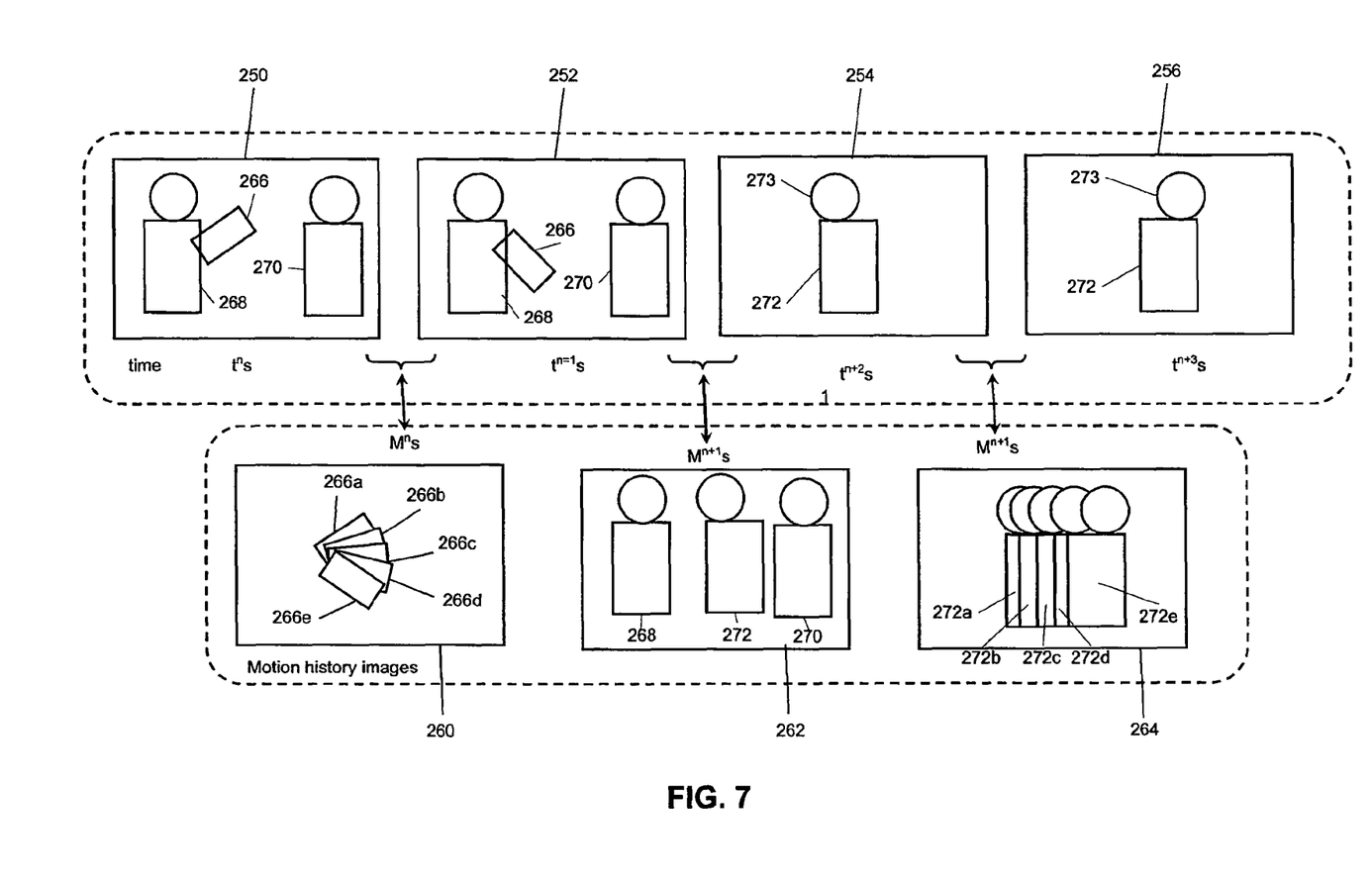
FIG. 7 is a block diagram representation of exemplary perceptual video features.

FIG. 7 illustrates a sample set of perceptual video features extracted using the present system. The perceptual motion analysis consists of creating motion history templates 260, 262, and 264 based on the frame differencing method within a given time interval.

Motion history templates 260 and 264, as shown in FIG. 7, are used to compute motion energy images of video buffers within a time interval. The motion energy image is segmented into regions using connected component analysis. The segmented regions are then sorted based on their area (i.e. total number of pixels in a given segmented region). The most significant motion energy regions (e.g., top five largest motion energy region) are selected for further motion direction and motion magnitude analysis on these selected regions. These most significant motion energy regions are then resorted based on their motion magnitude. Only the regions with significant motion magnitude are selected and information regarding their 2D location (i.e., centroid of the segmented region), size (i.e., area of the segmented region), and motion magnitude and direction are stored in a perceptual video fingerprint unit.

For example, several frames 250, 252, 254, and 256 are selected from a video, preferably at uniform time intervals. FIG. 7 may represent, for example, three people 268, 270, and 272. The first motion history template 260 captures movement from the first person 268. The different positions of block 266 in the first two frames 250, 252 may represent, for example, an arm moving. Intermediate frames may exist between the first two frames 250 and 252. The motion history template 260 captures the movement of the arm 266 as shown in blocks 266a-266e. Similarly, motion history template 264 captures the motion of the third person 272 which may be for example a head 273 turning from side-to-side in blocks 272a-272e.

Figure 8:
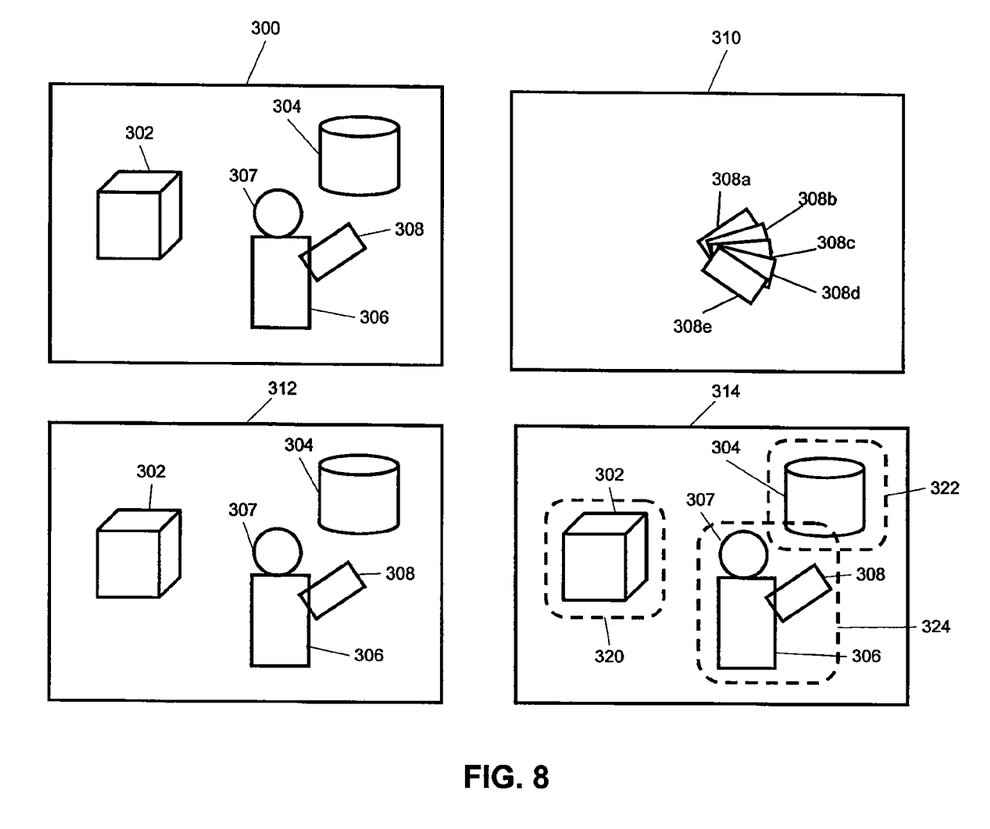
FIG. 8 is a block diagram representation of exemplary perceptual video features.

The perceptual color analysis consists of color region segmentation of video buffers and determining the color regions with distinguishable features compared to ones from other regions within the video buffer. In order to apply this perceptual color segmentation, a color space is selected. A color space is a model representing colors as including varying magnitudes of base components, typically three or four components. Common color-spaces include, for example, Red-Green-Blue (RGB), Cyan-Magenta-Yellow-Black (CMYK), YUV which stores a luminance and two chrominance values, and Hue, Saturation, Value (HSV). According to one embodiment, the RGB color space is used, but any color space known to one skilled in the art may be selected.

FIG. 8 also illustrates extracting a sample set of perceptual video features using the present system. For a given video frame buffer 300, a color histogram may be computed. In order to increase processing speed, and reduce the size of the color histogram, a color sub-sampling method is applied. Color sub-sampling reduces the number of colors used to represent the visual information in a video buffer 400. For example, in the RGB color space, a typical color of a pixel in a video buffer may be represented varying magnitudes of red, green, and blue where the magnitude range is typically 0-255. As a result, the color may be represented by one of 16,777,216 (256×256×256) different colors. However, such fine color resolution is not required to detect duplicate or near duplicate videos. Consequently, sub-sampling maps multiple colors in a color space to one color (e.g, similar red colors can be represented by one of the red colors in that group). Preferably, the sub-sampling may reduce the RGB color space from one having a magnitude range of 0-255 to a color space having magnitude ranges of 0-3, resulting in significantly faster calculation of color histograms and comparisons between video buffers 400.

After computing the color histogram, the "nth" (e.g. third) largest bin of the color histogram is examined to determine if it is a significant color in the image. For a color to be considered significant, the bin should include at least 10% of the number of pixels in the video buffer 400 and be a color other than black, or nearly black. For an RGB color space, nearly black colors are preferably defined as those colors less than about 5% of the total color value. If the nth bin is not significant, then the n+1th one is selected. In most cases, the proper bin to select as the "nth" bin is determined by first using a small amount of a video to determine how many distinguishable colors are present in the video. Pixels having the color in the color bin are grouped into a segment and the centroid of this segmented region is computed. The total number of pixels in this region is also computed. The color, centroid, and number of pixels are stored as the perceptual color features. This process repeats for each of the next largest color bins.

The segmented colors provide a color template 312 which identifies each significant color in the buffer 400. For example, each object in the original video frame 300 may have a unique color. Any color may be identified, but for purposes of this example, the first block 302 may be red, the second block 304 may be green, and the combination of blocks 306, 307, and 308, which may represent a person as also seen in FIG. 7, may each be another unique color. Each of the colors which exceed the threshold is identified as a perceptual feature 220 of the video.

In addition to perceptual color and motion analysis, scene change detection methods are applied to provide time markers at instants with significant scene change in the video. FIG. 7 illustrates an example of significant scene change detected with a motion history template 262. For example, between frames 252 and 254, two people 268 and 270 in a scene in the second frame 252 may no longer be in the scene in the third frame 254. Similarly, the scene in the third frame 254 may include a third person 272 not in the prior scene of the second frame 252. The motion history template 262 detects the difference between the two frames and captures each of the three people 268, 270, and 272 on the template 262. The abrupt change is noted along with the time interval at which the scene changed occurred.

Along with color and motion features, scene-change markers are also stored in perceptual video signature 200 and served as a time marker allowing a time normalization method to be performed during video processing and search. The time normalization according to these scene change markers allows, for example, two videos of different speeds to be aligned in time. For example, the second video 131 may be a duplicate of the first video 130 but have been recorded at a different video speed. The different speeds will cause the time markers to not align with respect to the time interval from the start of the video; however, the relative time between the markers will remain the same. For example, the first video 130 may include scene changes that occur at times 3, 6 and 9 seconds and the second video may have the same scene changes occur at times 2, 4, and 6 seconds. Although the exact times of each scene change is not the same, the relative time intervals between markers remain the same. Thus, time normalization determines the relative positions between time markers, permitting videos of different speeds to be compared.

FIG. 9 illustrates a high-level perceptual video signature generation process, according to one embodiment of the present invention. Once the perceptual color and motion analysis are performed, the perceptual features 220 distinguishable from others are selected and stored in the perceptual finger print unit 210.

A very large collection of videos will generate a very large collection of perceptual video signatures 200. Reducing the size of the collection of video signatures 200 without impacting the performance of the near-duplicate video detection operation is desirable. In the present system, a significant perceptual video feature selection function is used to reduce the size of each video signature 200. For example, the most significant two perceptual motion features 230, the most significant two color features 232, and one time normalization marker 22 may be selected and stored in a video fingerprint unit.

The density (granularity) of the video finger print unit depends on how much information is stored for a particular time interval. In the present system, there is no limitation on the number of perceptual features 220 that may be selected and stored for identification; however, an increased number of perceptual features 220 may affect real-time performance and near-duplicate video detection accuracy performance. The more features 220 stored in a single video signature 200, the higher the near-duplicate detection accuracy (i.e, lower the false positives and the false negatives). However, as more features 220 are stored, it may adversely affect the performance of other operations such as searching and indexing.

When the video fingerprint unit 210 is generated for a particular video segment interval (typically one second), it is concatenated to generate a perceptual video signature 200 for the corresponding video. The perceptual signature 200 can be in any arbitrary length depending on the granularity of video fingerprint units 210 and the length of the video. For instance, 30 minutes of a video may consists of 1800 video fingerprint units 210 where each fingerprint unit 210 represents a one second video segment.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

I claim:

1. A method of identifying a video signal comprising the steps of:

receiving a first video signal at a processing device from an input device operably connected to the processing device;

executing the following steps on a processing device;

extracting at least one perceptual feature from a plurality of frames of the first video signal;

assigning a weighting value to each perceptual feature;

selecting at least a portion of the perceptual features according to the weighting value;

extracting at least one additional feature from the plurality of frames of the first video signal;

creating a digital fingerprint from the selected perceptual features and from the at least one additional feature;
creating a first digital signature from a plurality of the digital fingerprints;
storing the first digital signature which identifies the video signal according to the sorted perceptual features in a database;
assigning a cost value to a plurality of edit operations;
comparing the first digital signature to a second digital signature to identify each edit operation required to transform the first digital signature to the second digital signature;
adding a total cost of from the cost value for each of the edit operations; and
comparing the total cost of the edit operations against a predetermined level to determine whether the first and the second digital signatures identify a near-duplicate video signal.

2. The method of identifying a video signal of claim 1 wherein the processing device executes the additional step of normalizing a height and a width of the first video signal prior to extracting the perceptual feature.

3. The method of identifying a video signal of claim 1 wherein the first video signal includes a visual and an audio component and the perceptual feature is extracted from either the visual or audio component.

4. The method of identifying a video signal of claim 1 wherein the processing device executes the additional steps of:
detecting a set of perceptual features in a first frame;
detecting a change in the set of perceptual features in a second frame;
determining a time marker at which the change in the set of perceptual features occurred; and
including the time marker of the change in the digital fingerprint.

5. The method of identifying a video signal of claim 4 wherein the time marker is normalized with respect to a length of the first video signal.

6. The method of identifying a video signal of claim 1 wherein the digital fingerprint is generated using a first frame and a second frame separated by about 1 second.

7. The method of identifying a video signal of claim 1 wherein the processing device executes the additional step of concatenating multiple digital fingerprints to create the first digital signature wherein the digital fingerprints are stored in the database as a part of the digital signature.

8. A method of identifying a video signal comprising the steps of:
receiving a video signal at a processing device from an input device operably connected to the processing device;
executing the following steps on a processing device;
extracting at least one perceptual feature from a plurality of frames of the video signal;
assigning a weighting value to each perceptual feature;
selecting at least a portion of the perceptual features according to the weighting value, wherein each perceptual feature is one of a motion and a color;
extracting at least one additional feature from the plurality of frames of the video signal, wherein each additional feature is one of a scene change and an object displayed in the video signal;
creating a digital fingerprint from the selected perceptual features and from the at least one additional feature;
storing the digital fingerprint which identifies the video signal according to the sorted perceptual features in a database;
segmenting the frames into a plurality of regions prior to extracting the perceptual feature;
selecting at least one region to include in the digital fingerprint according to a magnitude of motion energy in the region; and
including the magnitude and a direction of the motion energy and a centroid and a size of each selected region in the digital fingerprint,
wherein the weighting value is the magnitude and the direction of the motion energy identified in each of the regions.

9. The method of identifying a video signal of claim 1 wherein each perceptual feature is one of a motion and a color and each additional feature is one of a scene change and an object displayed in the first video signal and wherein the processing device executes the additional steps of:
selecting a color space prior to extracting the perceptual feature,
identifying at least one desired color according to a color histogram; and
segmenting the frame into a plurality of regions according to each desired color;
wherein the weighting value is the color histogram identifying the colors in the frame and wherein the color and a centroid and a size of each selected region are included in the digital fingerprint.

10. The method for identifying a video signal of claim 1 wherein each perceptual feature is one of a motion and a color and each additional feature is one of a scene change and an object displayed in the first video signal and wherein the digital fingerprint includes a first and a second motion, a first and a second color, and a first time-normalization marker.

11. The method of identifying a video signal of claim 8 wherein the processing device executes the additional step of normalizing a height and a width of the video signal prior to extracting the perceptual feature.

12. The method of identifying a video signal of claim 8 wherein the processing device executes the additional steps of:
detecting a set of perceptual features in a first frame;
detecting a change in the set of perceptual features in a second frame;
determining a time marker at which the change in the set of perceptual features occurred; and
including the time marker of the change in the digital fingerprint.

13. The method of identifying a video signal of claim 8 wherein the processing device executes the additional step of concatenating multiple digital fingerprints to create a digital signature wherein the digital fingerprints are stored in the database as a part of the digital signature.

14. A system for comparing a first video signal to a second video signal for the purpose of identifying near-duplicate videos comprising:
a processing device that receives the first video signal and that calculates a first perceptual digital signature of the first video signal, the first perceptual digital signature comprising a plurality of perceptual digital fingerprints; and
a database, operably connected to the processing device and storing a plurality of additional perceptual digital signatures, each additional perceptual digital signature comprising a plurality of perceptual digital fingerprints;
wherein the processing device;

divides the first perceptual digital signature into a plurality of segments for comparison to the additional perceptual digital signatures using a video edit distance;

compares the first perceptual digital signature to at least a portion of the additional perceptual digital signatures to identify near-duplicate videos; and identifies each segment of the first perceptual digital signature as a partial match of the additional digital signature if the video edit distance between at least three fingerprints of the first perceptual digital signature and three fingerprints of the additional perceptual digital signatures is zero.

15. The system of claim 14 further comprising a network connecting the database to the processing device.

16. The system of claim 14 wherein the processing device identifies the first video signal as a near-duplicate of the second video signal if at least three segments of the first perceptual digital signature are a partial match of the additional perceptual digital signature.

17. The system of claim 14 wherein the database includes perceptual digital signatures of at least one copyrighted video and the processing device identifies if the first video signal is infringing the copyrighted video.

18. The method of identifying a video signal of claim 14 wherein the processing device executes the additional step of normalizing a height and a width of the video signal prior to calculating the first perceptual digital signature.

* * * * *